Patented June 17, 1947

UNITED STATES PATENT OFFICE 2,422,622

SYNTHESIS OF VITAMIN B6

Stanton A. Harris, Westfield, N. J., assignor to Merck & Co., Inc., Rahway, N. J., a corporation of New Jersey No Drawing. Original application January 24, 1942, Serial No. 428,080, which is a division of application Serial No. 293,131, September 1, 1939, now Patent No. 2,272,198, dated February 10, 1942. Divided and this application January 10, 1946, Serial No. 640,390

9 Claims. (Cl. 260—297.5)

This invention relates to the synthesis of vitamin B6 and to various intermediates employed in the synthesis, and is a division of my co-pending application Serial No. 428,080, filed January 24, 1942, which is a division of application Serial No. 293,131, filed September 1, 1939, now Patent No. 2,272,198, issued February 10, 1942.

According to this invention it is found that 2-methyl-3-amino-4-alkoxymethyl-5-aminomethylpyridine or its dihydrohalide can be treated with concentrated hydrohalogen acid to form a dihydrohalide of 2-methyl-3-amino-4-halogenmethyl-5-aminomethylpyridine, the latter compound is converted to the dihydrohalide of 2-methyl-3-amino-4-hydroxymethyl-5-aminomethylpyridine, which yields vitamin B6 when diazotized. These reactions can be illustrated as follows:

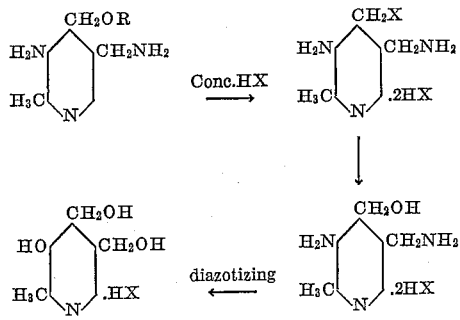

wherein R is alkyl and X is halogen.

The treatment of a 2-methyl-3-amino-4-alkoxymethyl-5-aminomethylpyridine dihydrohalide with concentrated hydrohalogen acid may be omitted, and a 2-methyl-3-amino-4-hydroxymethyl-5-aminomethylpyridine dihydrohalide formed directly by heating the former compound with a dilute hydrohalogen acid. This reaction can be illustrated as follows:

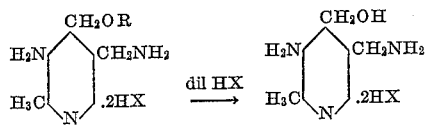

wherein R and X are as above.

The following example illustrates a specific method of carrying out the present invention, but it is to be understood that this example is given by way of illustration and not of limitation.

Example 1.55 grams of the dihydrochloride of 2-methyl-3-amino-4-ethoxymethyl-5-aminomethylpyridine are dissolved in 20 cc. of constant boiling hydrobromic acid and distilled until about one-half of the acid is distilled over. The concentrate is poured into a test tube, cooled, and crystallization induced by scratching. The product is centrifuged, washed with acetone and ether, and dried; melting point about 238.5° C. with decomposition. The product is recrystallized by dissolving in 1 to 2 cc. of water and adding 8 to 10 cc. of alcohol. On standing in ice, crystallization takes place; melting point about 260–265° C., with effervescence if the sample is not preheated. The yield of 2-methyl-3-amino-4-bromomethyl-5-aminomethylpyridine dihydrobromide is about one gram.

1 gram of 2-methyl-3-amino-4-bromomethyl-5-aminomethylpyridine dihydrobromide is dissolved in 100 cc. of water and heated on a steam bath for 1 to 2 hours. The mixture is clarified by filtration with charcoal, and the bromine ions are removed by stirring with an excess of silver chloride. The filtrate is concentrated almost to dryness under vacuum produced by a water pump, whereupon crystallization takes place. The 2-methyl-3-amino-4-hydroxymethyl-5-aminomethylpyridine dihydrochloride is recrystallized by dissolving in a little water, adding alcohol and scratching; melting point 235–237° C. with decomposition.

Alternatively, one gram of the monohydrate of 2-methyl-3-amino-4-ethoxymethyl-5-aminomethylpyridine dihydrochloride is dissolved in 15 cc. of 2.5 N HCl and heated in a bomb tube at 175–180° C. for four hours. The solution is filtered with a little charcoal, concentrated just to dryness at the water pump and recrystallized from a minimum of 95% alcohol. The yield of the 2-methyl-3-amino-4-hydroxy-methyl-5-aminomethylpyridine dihydrochloride is .67 g. or 80% of the theory. M. P. 235–237° C. This compound crystallizes very easily from 95% alcohol or a small amount of water plus alcohol.

1.28 grams of 2-methyl-3-amino-4-hydroxymethyl-5-aminomethylpyridine dihydrochloride in 22 cc. of distilled water is added simultaneously with a solution of a 2.24 grams $NaNO_2$ in water to 45 cc. of hot 2.5 N HCl. After completion of the diazotization, the solution is lemon yellow color. This acid solution is concentrated to dryness at the water pump and the residue extracted with acetone which removes some of the color. The vitamin B6 hydrochloride is extracted from the sodium chloride with hot absolute alcohol. This warm alcohol solution is filtered with a little charcoal and concentrated to small volume. On the addition of acetone, vitamin B6 hydrochloride crystallizes. Yield 0.5 gram or 45% of theory. M. P. 208° C.

Modifications may be made in carrying out the present invention without departing from the spirit and scope thereof, and I am to be limited only by the appended claims.

I claim:

1. In the synthesis of vitamin B6, the step which comprises treating 2-methyl-3-amino-4-hydroxymethyl-5-amino-methylpyridine dihydrohalide with a diazotizing agent and recovering vitamin B6 hydrohalide.

2. In the synthesis of vitamin B6, the step which comprises treating 2-methyl-3-amino-4-hydroxymethyl-5-amino-methylpyridine dihydrochloride with a diazotizing agent and recovering vitamin B6 hydrochloride.

3. In the synthesis of vitamin B6, the step which comprises treating 2-methyl-3-amino-4-hydroxymethyl-5-amino-methylpyridine dihydrohalide with sodium nitrite in the presence of water and a hydrohalogen acid and recovering vitamin B6 hydrohalide.

4. In the synthesis of vitamin B6, the step which comprises treating 2-methyl-3-amino-4-hydroxymethyl-5-amino-methylpyridine dihydrochloride with sodium nitrite in the presence of water and hydrochloric acid and recovering vitamin B6 hydrochloride.

5. In the synthesis of vitamin B6, the step which comprises treating 2-methyl-3-amino-4-hydroxymethyl-5-amino-methylpyridine dihydrochloride with nitrous acid and recovering vitamin B6 hydrochloride.

6. In the synthesis of vitamin B6, the steps which comprise reacting a compound of the class consisting of 2-methyl-3-amino-4-alkoxymethyl-5-aminomethylpyridine and hydrohalide salts thereof with a concentrated hydrohalogen acid to form the dihydrohalide of 2-methyl-3-amino-4-halomethyl-5-aminomethylpyridine, reacting the latter compound with water and silver chloride to form the dihydrochloride of 2-methyl-3-amino-4-hydroxymethyl-5-aminomethylpyridine, diazotizing the latter compound and recovering vitamin B6 hydrochloride.

7. In the synthesis of vitamin B6, the steps which comprise reacting 2-methyl-3-amino-4-alkoxymethyl-5-aminomethylpyridine dihydrochloride with concentrated hydrobromic acid to form the dihydrobromide of 2-methyl-3-amino-4-bromomethyl-5-aminomethylpyridine reacting the latter compound with water and silver chloride to form the dihydrochloride of 2-methyl-3-amino-4-hydroxymethyl-5-aminomethylpyridine, diazotizing the latter compound and recovering vitamin B6 hydrochloride.

8. In the synthesis of vitamin B6, the steps which comprise heating 2-methyl-3-amino-4-alkoxymethyl-5-aminomethylpyridine dihydrohalide with a dilute hydrohalogen acid to form the dihydrohalide of 2-methyl-3-amino-4-hydroxymethyl-5-aminomethylpyridine, diazotizing the latter compound and recovering vitamin B6 hydrochloride.

9. In the synthesis of vitamin B6, the steps which comprise heating 2-methyl-3-amino-4-ethoxymethyl-5-aminomethylpyridine dihydrochloride with dilute hydrochloric acid to form the dihydrochloride of 2-methyl-3-amino-4-hydroxymethyl-5-aminomethylpyridine, diazotizing the latter compound and recovering vitamin B6 hydrochloride.

STANTON A. HARRIS.